United States Patent [19]
Berger

[11] Patent Number: 5,930,878
[45] Date of Patent: Aug. 3, 1999

[54] DEVICE FOR COUPLING A THREAD, IN PARTICULAR A WEAVING THREAD

[75] Inventor: Franz Berger, Neukirchen, Austria

[73] Assignee: WIS Seaming Equipment, Inc., Sandpoint, Id.

[21] Appl. No.: 09/178,067

[22] Filed: Oct. 23, 1998

[30] Foreign Application Priority Data

Oct. 24, 1997 [AT] Austria ..................... 1804/97

[51] Int. Cl.⁶ ..................................... D02H 13/24
[52] U.S. Cl. ............................. 28/172.1; 28/172.2
[58] Field of Search ................. 28/172.1, 172.2, 28/190, 194, 240, 226; 269/287, 161; 242/149, 147 R, 157 R; 26/93, 94

[56] References Cited

U.S. PATENT DOCUMENTS

| | | | |
|---|---|---|---|
| 76,246 | 3/1868 | Powers | 28/172.1 |
| 585,266 | 6/1897 | Foster | 28/194 |
| 942,239 | 12/1909 | Begins | 28/172.1 |
| 1,019,332 | 3/1912 | Mathewson | 28/172.1 |
| 1,267,089 | 5/1918 | Lanning | 28/172.1 |
| 1,579,227 | 4/1926 | Mangum | 28/172.1 |
| 5,099,555 | 3/1992 | Okuda | 28/172.1 |

FOREIGN PATENT DOCUMENTS

| | | | |
|---|---|---|---|
| 901374 | 1/1982 | U.S.S.R. | 28/172.1 |
| 1094272 | 12/1967 | United Kingdom | 28/226 |

*Primary Examiner*—Amy Vanatta
*Attorney, Agent, or Firm*—Wells, St. John, Roberts, Gregory & Matkin, P.S.

[57] ABSTRACT

There is described a device for coupling a thread, in particular a weaving thread, to a tentering means comprising a clamping sleeve (1) and a clamping body (2) axially movable inside the clamping sleeve (1), which clamping body can be connected to a tentering means at its one end axially protruding beyond the clamping sleeve (1), and in the vicinity of its other end forms a clamping member for the thread end (7). To create advantageous constructional conditions it is proposed that on the side opposite the connection side of the tentering means the clamping sleeve (1) forms an end-face inlet opening (6) for the thread, and has a clamping portion (5) widening towards this inlet opening (6), between which clamping portion and the clamping member of the clamping body (2) drawn into the clamping sleeve (1) and designed as clamping head (4) there can be clamped the thread end (7) introduced into the clamping sleeve (1).

18 Claims, 1 Drawing Sheet

DEVICE FOR COUPLING A THREAD, IN PARTICULAR A WEAVING THREAD

CROSS-REFERENCE TO RELATED APPLICATIONS

The application claims priority under 35 USC § 119 to foreign patent application Ser. No. A1804/97, filed on Oct. 24, 1997 in Austria.

FIELD OF THE INVENTION

This invention relates to a device for coupling a thread, in particular a weaving thread, to a tentering means comprising a clamping sleeve and a clamping body axially adjustable inside the clamping sleeve, which clamping body can be connected to the tentering means at its one end axially protruding beyond the clamping sleeve, and in the vicinity of its other end forms a clamping member for the thread end.

DESCRIPTION OF THE PRIOR ART

For releasably connecting a weaving thread to a tentering means, there are known coupling devices substantially consisting of a clamping sleeve through which extends a strap made of spring wire, such that on both sides of the clamping sleeve receiving lugs are formed. The connection to the tentering means is effected by the one receiving lug. The other lug acts as clamping lug for the thread end to be coupled, which is introduced into the lug protruding from the clamping sleeve and is clamped by displacing the clamping sleeve, because the lug is drawn into the clamping sleeve like a loop. What is, however, disadvantageous in these known coupling devices is the fact that the required clamping force can only be ensured when the thread end to be clamped has a diameter lying in a comparatively limited range of tolerance. Apart from this, such coupling devices are susceptible to failure due to the spring wire strap. Moreover, the free end of the clamped thread protrudes beyond the lug, which may lead to failures, in particular when a plurality of such couplings must be arranged one beside the other with a small lateral distance.

SUMMARY OF THE INVENTION

It is therefore the object underlying the invention to create a device as described above for coupling a thread, in particular a weaving thread, to a tentering means with simple constructive means such that a reliable clamping of the thread can be ensured for a wide range of diameters of the threads to be clamped.

This object is solved by the invention in that on the side opposite the connection side of the tentering means the clamping sleeve forms an end-face inlet opening for the thread and has a clamping portion widening towards this inlet opening, between which clamping portion and the clamping member of the clamping body drawn into the clamping sleeve and designed as clamping head there can be clamped the thread end introduced into the clamping sleeve.

Since the clamping sleeve has a clamping portion widening towards an end-face inlet opening for the thread end, and the clamping body forms a clamping head to be drawn into this clamping portion, the width of the gap produced between the clamping head and the clamping portion depends on the length for which the clamping head is drawn into the clamping portion of the clamping sleeve. This means that up to a thread diameter which corresponds to the difference of the largest diameters of the clear width of the clamping portion of the clamping sleeve on the one hand and of the clamping head of the clamping body on the other hand all threads with a smaller diameter can be clamped between the clamping head and the clamping portion of the clamping sleeve. For this purpose, the clamping body with the clamping head need merely be advanced towards the inlet opening of the clamping sleeve, so that the thread end to be clamped can be introduced through the end-face inlet opening of the clamping sleeve between the same and the clamping body into the clamping portion of the clamping sleeve, so that upon drawing in the clamping head, the thread end is clamped between the clamping head and the clamping portion. For releasing this clamping connection, the clamping head need merely be advanced with respect to the clamping sleeve towards the inlet opening, which provides for a very easy handling. Since in addition the thread end to be clamped is introduced into the clamping sleeve, failures due to the thread ends protruding from the coupling device can be excluded.

Although it is merely important to provide a clamping surface inclined with respect to the direction of adjustment of the clamping head in the vicinity of the clamping portion of the clamping sleeve, which for instance can be ensured by a wedge-shaped clamping portion, particularly simple constructional conditions are obtained when the clamping portion of the clamping sleeve is conically flared towards the inlet opening, because in this case a simple form can be achieved not only for the clamping sleeve, but also for the clamping head. Under these conditions, the clamping head may be designed as a rotating body and for instance consist of a ball. Since the clamping body is axially movably guided inside the clamping sleeve with a radial clearance, the clamping head rests against the clamping portion of the clamping sleeve on the side opposite the introduced thread end, so that between the clamping portion and the clamping head a sickle-shaped gap is formed, which is narrowed when the clamping head is drawn into the conically tapering clamping portion, until the thread end is clamped between the clamping head and the clamping portion of the clamping sleeve. By correspondingly choosing the opening angle of the conical clamping portion, a self-locking can easily be achieved for the clamped thread, so that it is prevented that even at higher tensile loads acting on the thread the thread end is withdrawn from the clamping sleeve.

To additionally facilitate the handling when coupling the thread, the clamping head of the clamping body may be removable from the clamping sleeve through the inlet opening, so that for introducing the thread end into the clamping sleeve the inlet opening is cleared by the clamping head. Threading procedures are therefore no longer necessary, which require particular skills on the part of a person operating the coupling device.

BRIEF DESCRIPTION OF THE DRAWING

In the drawing, the subject-matter of the invention is represented by way of example, wherein.

DESCRIPTION OF THE PREFERRED EMBODIMENT

Figure 1:
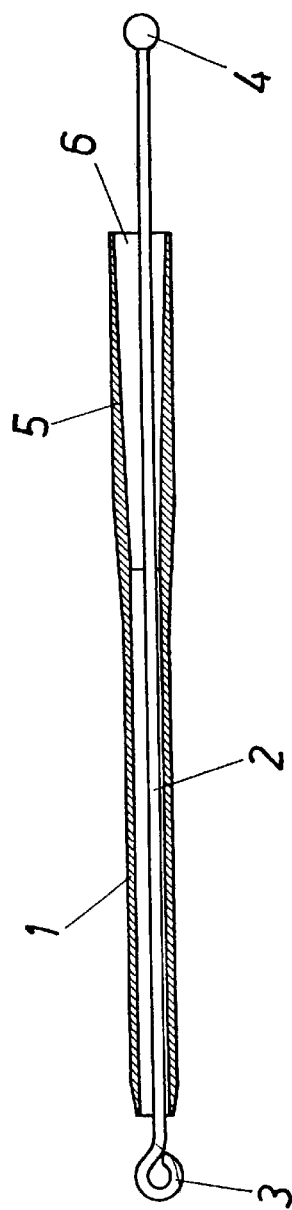
FIGS. 1 to 3 illustrate an inventive device for coupling a weaving thread to a tentering means in an axial section in various positions.

In accordance with the illustrated embodiment, the illustrated device for coupling a weaving thread to a tentering means substantially consists of a clamping sleeve 1 and a clamping body 2 axially movably guided in the clamping sleeve 1 with a radial clearance, which clamping body at its one end forms a connection lug 3 for a tentering means. At the opposite end of the clamping body 2 preferably formed of a wire there is provided a clamping head 4, which in accordance with the embodiment is designed as spherical head. This clamping head 4 cooperates with a clamping portion 5 of the clamping sleeve 1, which is conically flared towards an end-face inlet opening 6 for a thread end 7 to be clamped. Since the largest diameter of the conical flare of the clamping portion 5 in the vicinity of the inlet opening 6 is correspondingly larger, and the smallest diameter of this conical flare is correspondingly smaller than the diameter of the clamping head 4, each thread whose diameter is smaller than the difference of the largest diameter of the clamping portion 5 and the clamping head 4 can safely be clamped between the clamping head 4 drawn into the clamping sleeve 1 and the clamping portion 5 of the clamping sleeve 1.

Figure 2:
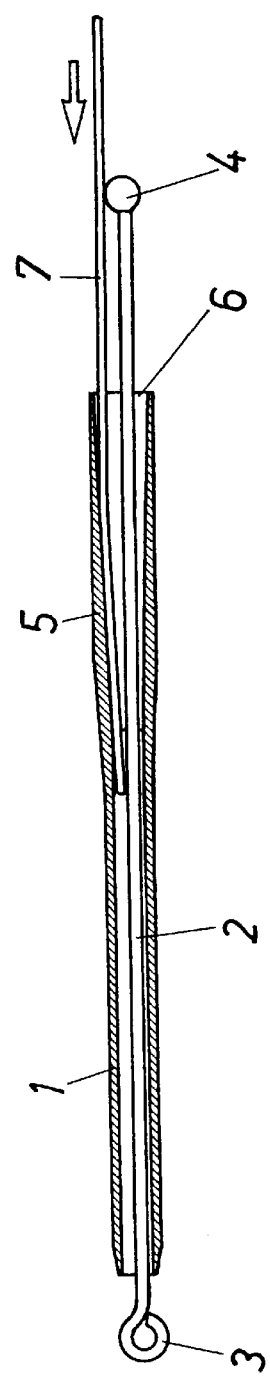
Figure 3:
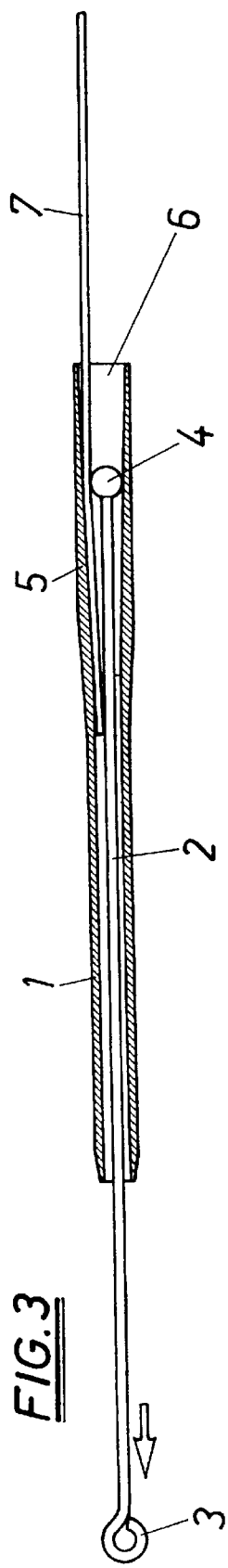

In FIGS. 2 and 3, the clamping procedure is represented in detail. For threading the thread end 7 through the inlet opening 6 of the clamping sleeve 1, the clamping body 2 with the clamping head 4 is advanced towards the inlet opening 6 of the clamping sleeve 1, until the clamping head 4 protrudes from the clamping sleeve 1, as this is illustrated in FIG. 1. The thread end 7 can therefore be introduced through the inlet opening 6 cleared by the clamping head 4 into the clamping portion 5 of the clamping sleeve 1, as this is shown in FIG. 2. When the clamping body 2 is then axially adjusted with respect to the clamping sleeve 1, so that the clamping head 4 is drawn into the clamping portion 5 of the clamping sleeve 1, the thread end 7 protruding into the clamping portion 5 is urged against the clamping portion 5 of the clamping sleeve 1 by the clamping head 4, where on the side opposition the thread end 7 the clamping head 4 is supported on the wall of the clamping portion 5. FIG. 3 illustrates this clamping position, in which the thread end 7 is self-lockingly clamped between the clamping head 4 drawn into the clamping sleeve 1 and the clamping portion 5 of the clamping sleeve 1. For releasing this clamping connection, the clamping head 4 must merely be ejected from the clamping sleeve 1, and the thread end 7 is released.

It need probably not be particularly emphasized that the clamping of the thread between the clamping head 4 and the clamping portion 5 of the clamping sleeve 1 tapering in the direction in which the clamping head 4 is drawn in is independent of the cross-sectional shape of the thread and also of whether the thread end to be clamped is substantially straight or repeatedly cranked, for instance.

I claim:

1. A thread coupling apparatus for engaging a weaving thread, comprising:
    a clamping sleeve defining a passageway having a first end and a second end;
    a clamping body reciprocally moveable within the passageway which is defined by the clamping sleeve, the clamping body having a first end and a second end, the clamping body second end being dimensioned to be received in the passageway and capture the weaving thread inside the passageway.

2. The thread coupling apparatus of claim 1, wherein the clamping body reciprocates from a first position wherein the second end of the clamping body is disposed outside of the passageway, to a second position wherein at least a portion of the second end of the clamping body is oriented within the passageway.

3. The thread coupling apparatus of claim 2, wherein the passageway defined by the clamping sleeve is defined by a first dimension at the first end of the clamping sleeve, and a second dimension at the second end of the clamping sleeve, and wherein the first dimension is less than the second dimension, and wherein the portion of the clamping body second end is receivable within the second end of the passageway defined by the clamping sleeve.

4. The thread coupling apparatus of claim 3, wherein the weaving thread is defined by a mean thread diameter, and wherein the second end of the clamping body comprises a thread engaging portion defined by a major dimension, and wherein the first dimension defining the passageway at the first end of the clamping sleeve is less than the sum of the major dimension of the second end of the clamping body and the mean thread diameter.

5. The thread coupling apparatus of claim 2, wherein the second end of the clamping sleeve receives the weaving thread within the passageway defined within the clamping sleeve, and wherein the weaving thread is engaged by a compressive force exerted between the second end of the clamping body and the clamping sleeve which defines the passageway, when the clamping body is located in the second position, and the second end of the clamping body is oriented within the passageway.

6. The thread coupling apparatus of claim 1, wherein the first end of the clamping body extends beyond the first end of the clamping sleeve, and a tentering means engages the first end of the clamping body.

7. The thread coupling apparatus of claim 5, wherein, the first end of the clamping body extends beyond the first end of the clamping sleeve, and a tentering means engages the first end of the clamping body, and wherein a force exerted on the tentering means is exerted on the clamping body, and wherein the force exerted on the clamping body is transmitted to the second end of the clamping body and to the thread.

8. The thread coupling apparatus of claim 1 wherein the second end of the clamping sleeve is spherical in shape.

9. The thread coupling apparatus of claim 1 wherein the second end of the clamping sleeve is conical in shape.

10. The thread coupling apparatus of claim 1 wherein the second end of the clamping sleeve is elliptical in shape.

11. The thread coupling apparatus of claim 1, wherein the passageway defined by the clamping sleeve is tapered from a first dimension to a second larger dimension as the taper approaches the second end of the clamping sleeve.

12. Apparatus for engaging an elongated strand of a material, comprising:
    a clamping sleeve defining a passageway having a first cross sectional shape at a strand receiving portion of the passageway; and
    a clamping body reciprocally moveable within the passageway defined by the clamping sleeve, the clamping body having a strand engaging portion having a second cross sectional shape, and wherein the first cross sectional shape of the strand receiving portion of the passageway and the second cross sectional shape of the strand engaging portion of the clamping body have substantially complementary shapes.

13. The apparatus of claim 12, wherein the clamping body reciprocates from a first position wherein the second end of the clamping body is disposed at least in part outside of the passageway defined by the clamping sleeve, to a second position wherein the strand engaging portion of the clamping body is oriented at least in part within the strand receiving portion of the passageway, and wherein the strand engaging portion of the clamping body substantially matingly nests within the strand receiving portion of the passageway when the clamping body is in the second position.

14. The apparatus of claim 13, wherein, the strand is engaged between the strand engaging portion of the clamping body and the portion of the clamping sleeve which defines the strand receiving portion of the passageway when the strand engaging portion nests within the strand receiving portion of the passageway.

15. The apparatus of claim 14, wherein the strand engaging portion of the clamping body and the portion of the clamping sleeve which defines the strand receiving portion of the passageway exerts a compressive force on the strand of material which is disposed therebetween.

16. Apparatus for engaging an elongated strand of a material, comprising:

a clamping sleeve defining a passageway having a first end defined by a first diameter, and a second end defined by a second diameter, the second diameter being greater than the first diameter; and a clamping body reciprocally moveable within the passageway defined by the clamping sleeve, the clamping body having a first end and a second end, the second end of the clamping body being dimensioned to be received at least in part in the second end of the passageway, and which compressively engages the strand of material against the clamping sleeve and inside the passageway.

17. The apparatus of claim 16, wherein the second end of the clamping body is dimensioned to prevent passage thereof through the passageway defined in the clamping sleeve at the first end of the clamping sleeve.

18. The apparatus of claim 16 wherein, the first end of the clamping body extends beyond the first end of the clamping sleeve, and wherein a tensile force is applied to the first end of the clamping body.

\* \* \* \* \*